US011574463B2

(12) United States Patent
Pandey et al.

(10) Patent No.: US 11,574,463 B2
(45) Date of Patent: Feb. 7, 2023

(54) NEURAL NETWORK FOR LOCALIZATION AND OBJECT DETECTION

(71) Applicant: Ford Global Technologies, LLC, Dearborn, MI (US)

(72) Inventors: Gaurav Pandey, College Station, TX (US); Nikita Jaipuria, Union City, CA (US); Praveen Narayanan, San Jose, CA (US); Punarjay Chakravarty, Campbell, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 252 days.

(21) Appl. No.: 16/799,210

(22) Filed: Feb. 24, 2020

(65) Prior Publication Data

US 2021/0264213 A1 Aug. 26, 2021

(51) Int. Cl.
*G06V 10/774* (2022.01)
*G06K 9/62* (2022.01)
*G06N 3/08* (2006.01)
*B60W 60/00* (2020.01)
*G06V 20/58* (2022.01)

(52) U.S. Cl.
CPC ..... *G06V 10/7753* (2022.01); *B60W 60/0053* (2020.02); *B60W 60/0059* (2020.02); *G06K 9/6259* (2013.01); *G06N 3/08* (2013.01); *G06V 20/58* (2022.01)

(58) Field of Classification Search
CPC ............ G06K 9/6259; B60W 60/0053; B60W 60/0059; G06N 3/0454; G06N 3/08; G06V 10/7753
See application file for complete search history.

(56) References Cited

U.S. PATENT DOCUMENTS

| 10,262,234 B2 | 4/2019 | Li et al. | |
| 2016/0167668 A1* | 6/2016 | Prokhorov | B60W 30/182 701/302 |
| 2018/0201227 A1* | 7/2018 | Gao | B60R 25/305 |
| 2019/0258251 A1 | 8/2019 | Ditty et al. | |

(Continued)

OTHER PUBLICATIONS

Chougule, et al. (An efficient encoder-decoder CNN architecture for reliable multilane detection in real time), pp. 1444-1451. (Year: 2018).*

(Continued)

*Primary Examiner* — Daniel G Mariam
(74) *Attorney, Agent, or Firm* — Frank A. MacKenzie; Bejin Bieneman PLC

(57) ABSTRACT

The present disclosure discloses a system and a method. In an example implementation, the system and the method generate, at a first encoder neural network, an encoded representation of image features of an image received from a vehicle sensor of a vehicle. The system and method can also generate, at a second encoder neural network, an encoded representation of map tile features and generate, at the decoder neural network, a semantically segmented map tile based on the encoded representation of image features, the encoded representation of map tile features, and Global Positioning System (GPS) coordinates of the vehicle. The semantically segmented map tile includes a location of the vehicle and detected objects depicted within the image with respect to the vehicle.

20 Claims, 7 Drawing Sheets

(56) References Cited

U.S. PATENT DOCUMENTS

2019/0271548 A1    9/2019  Colgate et al.
2020/0134054 A1*   4/2020  Viswanathan ........ G06F 16/245

OTHER PUBLICATIONS

Caltagirone et al., "LIDAR-based Driving Path Generation Using Fully Convolutional Neural Networks", arXiv:1703.08987v2 [cs.CV] Apr. 3, 2017.

* cited by examiner

NEURAL NETWORK FOR LOCALIZATION AND OBJECT DETECTION

BACKGROUND

Deep neural networks (DNNs) can be used to perform many image understanding tasks, including classification, segmentation, and captioning. For example, convolutional neural networks can take an image as input, assign an importance to various aspects/objects depicted within the image, and differentiate the aspects/objects from one another.

DETAILED DESCRIPTION

Figure 1:
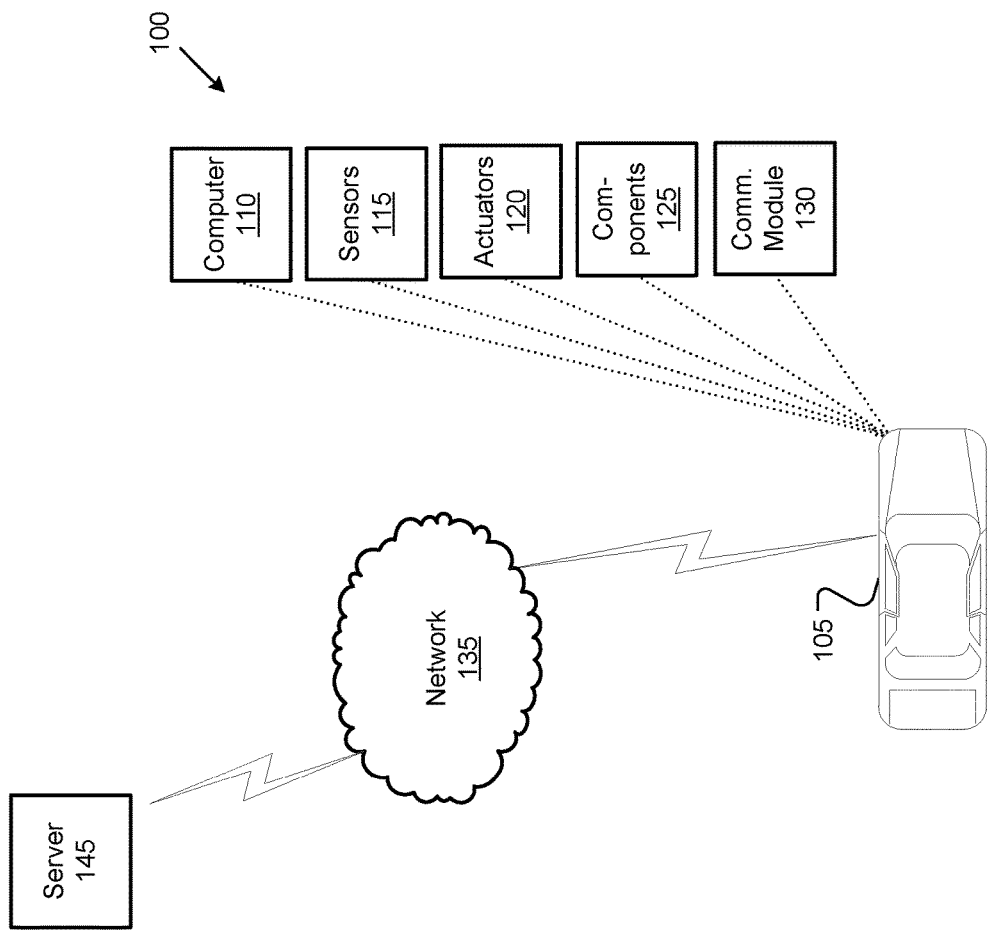
FIG. 1 is a diagram of an example system including a vehicle.

A system comprises a computer including a processor and a memory, and the memory including instructions such that the processor is programmed to generate, at a first encoder neural network, an encoded representation of image features of an image received from a vehicle sensor of a vehicle; generate, at a second encoder neural network, an encoded representation of a map tile features; and generate, at the decoder neural network, a semantically segmented map tile based on the encoded representation of image features, the encoded representation of map tile features, and Global Positioning System (GPS) coordinates of the vehicle, wherein the semantically segmented map tile includes a location of the vehicle and detected objects depicted within the image with respect to the vehicle.

In other features, the processor is further programmed to actuate the vehicle based on the detected objects.

In other features, the processor is further programmed to estimate a distance between the detected objects and the vehicle, determine whether the estimated distance is greater than a predetermined distance threshold, and generate an alert when the estimated distance is not greater than the predetermined distance threshold.

In other features, the processor is further programmed to determine whether the vehicle has stopped or is moving in an opposite direction, and actuate the vehicle when the vehicle has not stopped and is not moving in the opposite direction.

In other features, the processor is further programmed to cause the vehicle to transition from a non-autonomous mode to an autonomous mode based on the detected objects.

In other features, the decoder neural network receives the encoded representation of image features, the encoded representation of map tile features, and the GPS coordinates of the vehicle from a latent embedding layer.

In other features, the map tile features are based on a map tile received from a cloud-based service, the map tile representing a map corresponding to a location of the vehicle.

In other features, the semantically segmented map tile includes at least one visual indicator indicative of the relative position of the vehicle within the semantically segmented map tile.

In other features, the semantically segmented map tile includes at least one visual indicator indicative of the position of the detected objects.

A method comprises generating, at a first encoder neural network, an encoded representation of image features of an image received from a vehicle sensor of a vehicle, generating, at a second encoder neural network, an encoded representation of a map tile features, and generating, at the decoder neural network, a semantically segmented map tile based on the encoded representation of image features, the encoded representation of map tile features, and Global Positioning System (GPS) coordinates of the vehicle, wherein the semantically segmented map tile includes a location of the vehicle and detected objects depicted within the image with respect to the vehicle.

In other features, the method includes actuating the vehicle based on the detected objects.

In other features, the method includes estimating a distance between the detected objects and the vehicle, determining whether the estimated distance is greater than a predetermined distance threshold, and generating an alert when the estimated distance is not greater than the predetermined distance threshold.

In other features, the method includes determining whether the vehicle has stopped or is moving in an opposite direction, and actuating the vehicle when the vehicle has not stopped and is not moving in the opposite direction.

In other features, the method includes causing the vehicle to transition from a non-autonomous mode to an autonomous mode based on the detected objects.

In other features, the method includes receiving the encoded representation of image features, the encoded representation of map tile features, and the GPS coordinates of the vehicle from a latent embedding layer.

In other features, the map tile features are based on a map tile received from a cloud-based service, the map tile representing a map corresponding to a location of the vehicle.

In other features, the semantically segmented map tile includes at least one visual indicator indicative of the position of the vehicle.

In other features, the semantically segmented map tile includes at least one visual indicator indicative of the position of the detected objects.

A system comprises a computer including a processor and a memory, and the memory includes instructions such that the processor is programmed to: train a neural network with a set of labeled training images, wherein the set of labeled training images comprises at least one training image depicting an object within a field-of-view of a vehicle camera and at least one training label indicating a distance between the object and the vehicle camera and a position of the vehicle within a map tile, generate a semantically segmented map tile based on at least one non-labeled training image at the deep neural network, wherein the semantically segmented map tile includes a relative location of the vehicle and locations of detected objects with respect to the vehicle, compare the semantically segmented map tile with ground truth data, and update at least one weight associated with a neuron of the neural network.

In other features, the semantically segmented map tile includes at least one visual indicator indicative of the relative position of the vehicle within the semantically segmented map tile.

In other features, the neural network includes a decoder that is configured to generate the semantically segmented map tile.

Autonomous vehicles typically employ perception algorithms to perceive the environment around the vehicle. The perception algorithms can use one or more deep neural networks to assist in localization, detecting, and/or classifying objects.

Currently, vehicles may employ multiple types of sensors, such as cameras, RADAR, and/or LiDAR, to localize the vehicle within a map as well as to detect and to measure distances between objects and the vehicle. The present disclosure discloses a vehicle that includes one or more neural networks that generate a semantically segmented map based on an image, e.g., a two-dimensional image, captured by a camera sensor of the vehicle. The neural networks can localize, e.g., determine a relative position of the vehicle and/or detected objects, within a map tile. The semantically segmented map can be provided to other vehicle systems to allow the vehicle to plan and/or control one or more aspects of the vehicle based on the detected objects.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (LiDAR) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
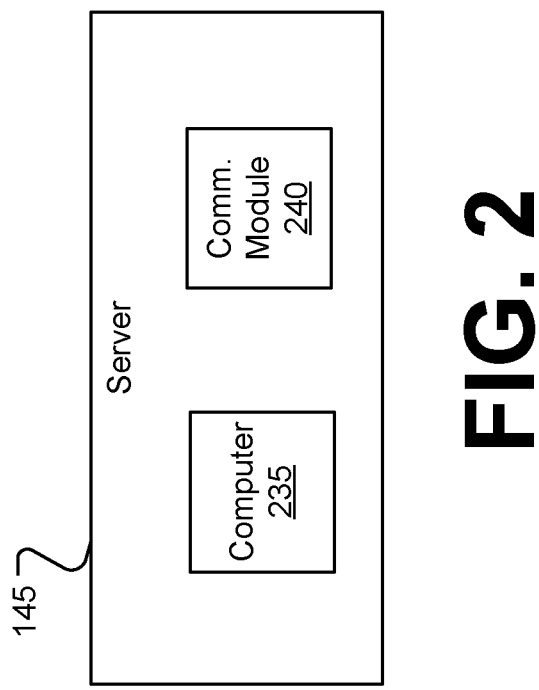
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
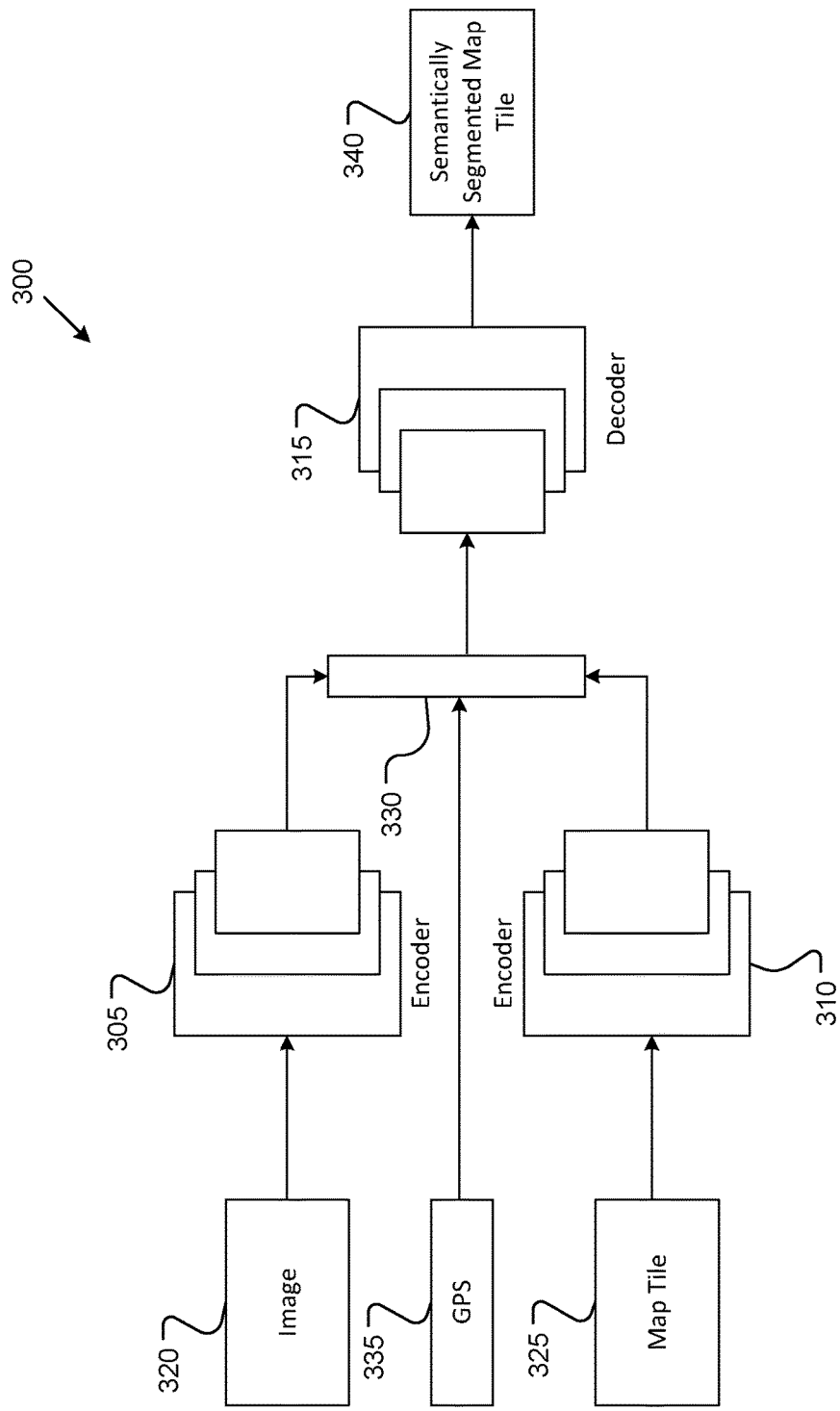
FIG. 3 is a diagram illustrating an example encoder-decoder neural network system.

FIG. 3A is a diagram of an example neural network 300. The neural network 300 can be a software program that can be loaded in memory and executed by a processor in the vehicle 105 and/or the server 145, for example. As shown, the neural network 300 comprises an encoder-decoder architecture that includes a first encoder 305, a second encoder 310, and a decoder 315.

The encoders 305, 310 generate an encoded representation of the respective input. As shown, the first encoder 305 receives an image 320 as input, and the second encoder 310 receives a map tile 325 as input. The image 320 may comprise an image frame captured by a vehicle 105 sensor 115, such as a forward-facing camera. For example, the image 320 can depict the environment to the front of the vehicle 105. The map tile 325 depicts a portion of a map, e.g., a portion of a map depicting an area of interest. In some implementations, the map tile 325 may be provided to the vehicle 105 computer 110 via the communication module 130 upon request.

For example, the encoder 305 generates an encoded representation of image properties, such as a fixed dimensional vector representation of image features. The encoder 310 generates an encoded representation of map properties, such as a fixed dimensional vector representation of map features. In various implementations, the encoders 305, 310 may comprise Convolution-BatchNorm-ReLU architectures.

The encoded representations generated by the encoders 305, 310 are provided to a latent embedding layer 330. The latent embedding layer 330 of the neural network 300 also receives Global Positioning System (GPS) coordinates 335. In some implementations, the GPS coordinates 335 can be provided by one or more vehicle 105 sensors 115. The decoder 315 receives the encoded representations of the image properties and the map properties as well as the GPS coordinates 335. The decoder 315 generates an estimated reconstruction based on the inputs. The estimated reconstruction comprises a semantically segmented map tile 340 that can include a location of the vehicle 105 and locations of objects relative to the vehicle 105, e.g., relative within the map tile, based on the received map tile 325. For example, the semantically segmented map tile 340 may include depictions of the location of the vehicle 105 within the map tile 325 and depictions of the location of various objects depicted in the image 320 within the map 325 relative to the vehicle 105. The decoder 315 may comprise a Deconvolution-BatchNorm-LeakyReLU architecture.

Figure 4A:
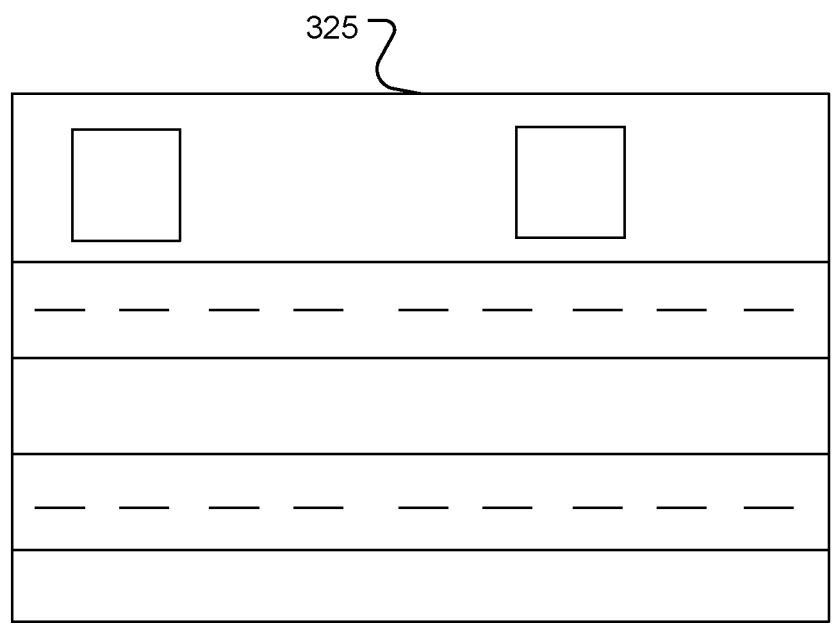
FIG. 4A is a diagram of an example map tile input into the encoder-decoder neural network system.
Figure 4B:
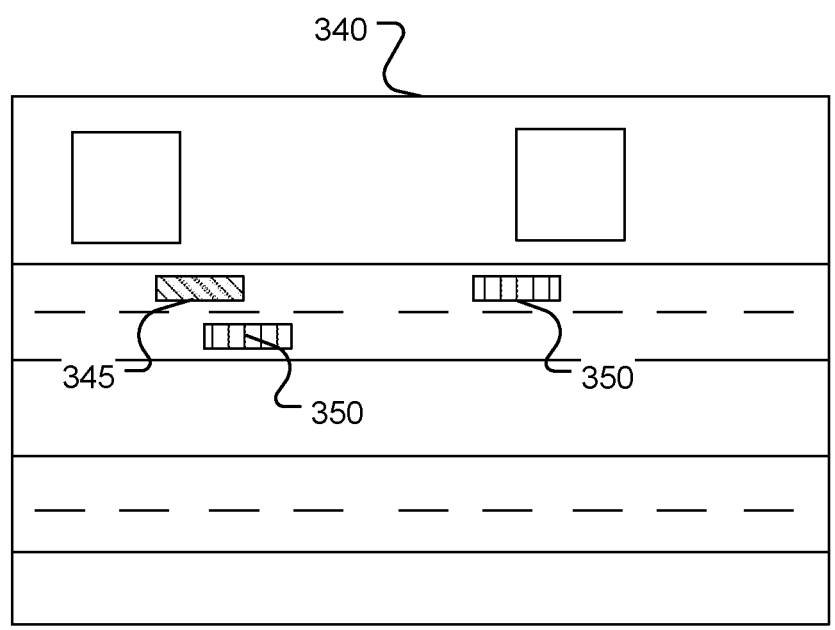
FIG. 4B is a diagram of an example semantically segmented map tile generated by the encoder-decoder neural network system.

FIG. 4A illustrates an example map tile 325 received by the encoder 310. In some implementations, the computer 110 requests the map tile 325 from a cloud-based service, and the cloud-based service provides the map tile 325 based on the GPS coordinates of the vehicle 105. FIG. 4B illustrates an example semantically segmented map tile 340 generated by the decoder 315. As shown, the semantically segmented map tile 340 can include a visual indicator 345 representing a position of the vehicle 105 within the map tile 340 and visual indicators 350 representing a relative position of one or more objects captured by the vehicle 105 sensors 115. The cloud-based service may comprise any suitable service that provides map tiles, such as GOOGLE Maps, or the like.

Figure 5:
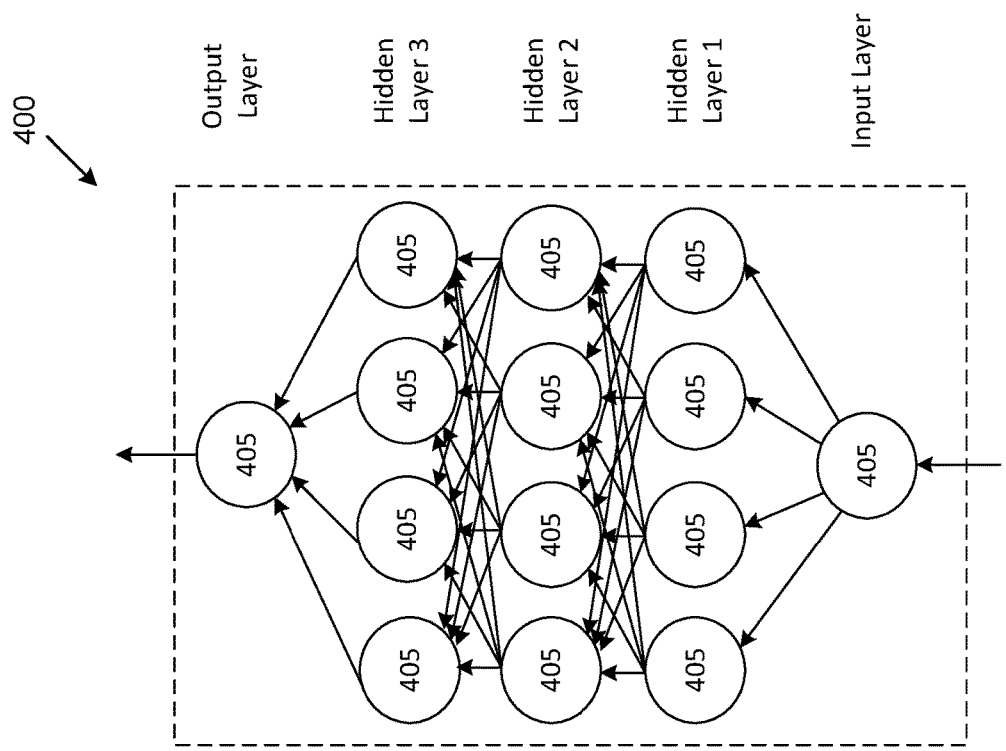
FIG. 5 is a diagram of an example deep neural network.

FIG. 5 is a diagram of an example deep neural network (DNN) 400. The DNN 400 may be representative of the encoders 305, 310 and/or the decoder 315 described above. The DNN 400 includes multiple nodes 405, and the nodes 405 are arranged so that the DNN 400 includes an input layer, one or more hidden layers, and an output layer. Each layer of the DNN 400 can include a plurality of nodes 405. While FIG. 4 illustrates three (3) hidden layers, it is understood that the DNN 400 can include additional or fewer hidden layers. The input and output layers may also include more than one (1) node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept data as input and generate an output based on the input. The DNN 400 can be trained with ground truth data, i.e., data about a real-world condition or state. For example, the DNN 400 can be trained with ground truth data or updated with additional data by a processor. Weights can be initialized by using a Gaussian distribution, for example, and a bias for each node 405 can be set to zero. Training the DNN 400 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing objects and object labels.

Figure 6A:
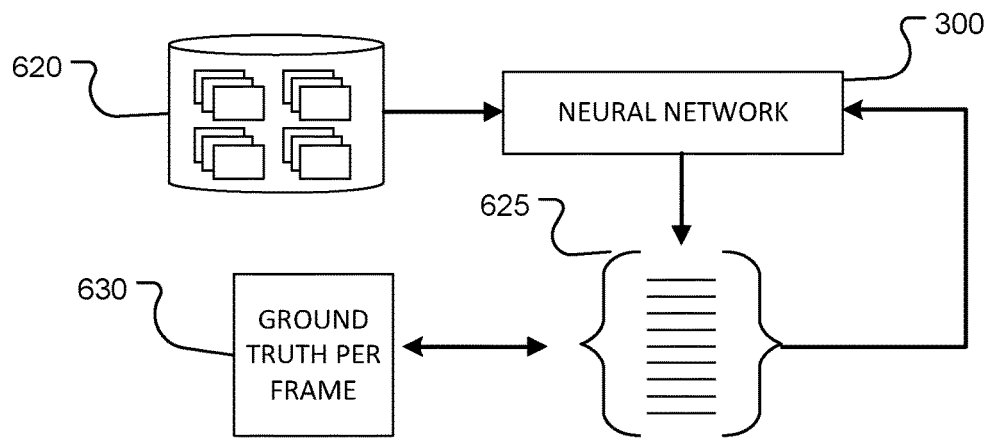
FIG. 6A is a diagram illustrating an example process for training a deep neural network.

FIG. 6A illustrates an example process for training the neural network 300 in accordance with one or more implementations of the present disclosure. During a supervised training phase, a set of N training data 620 is input to the neural network 300. The neural network 300 generates semantically segmented map tiles for each of the N training images 620. The training data 620 can include training images representing a field-of-view of a camera, training map tiles, GPS coordinates, and training labels. The training labels can include semantically segmented map tiles generated prior to the supervised training phase.

The semantically segmented map tiles can include markings indicative of the vehicle 105 location corresponding to training GPS coordinates as well as markings indicative of obstacles. The markings of the obstacles can include obstacle position and class labels that can be obtained from LiDAR sensors and camera data within the field-of-view of the camera. The map tiles may comprise an occupancy layer of a high-definition map. The trained neural network 300 may also be trained to estimate distances between the detected objects and the source of the image. For example, the training data 620 may also include distances of objects within the field-of-view of the camera measured by ultrasonic sensors, LiDAR sensors, and/or radar sensors.

As shown, the neural network 300 can generate output for a training image of the N training images 620. After supervised training, the neural network 300 may receive GPS coordinates, a map tile, and an image. The neural network 300 outputs semantically segmented map tiles 625 including locations of the vehicle and objects relative to the vehicle within the map tile. The semantically segmented map tile 625 can be compared to the ground-truth data 630, and the neural network 300 updates network parameters based on the comparison to the ground-truth boxes 630. For example, the network parameters, e.g., weights associated with the neurons, may be updated via backpropagation.

The neural network may be trained at the server 145 and provided to the vehicle 105 via the communication network 135. The vehicle 105 may also provide data captured by the vehicle 105 systems to the server 145 for further training purposes.

Figure 6B:
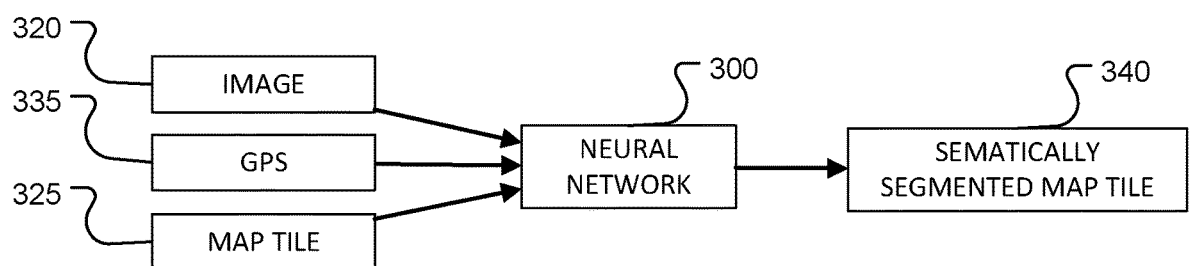
FIG. 6B is a diagram illustrating an example process for generating output at a deep neural network based on received input.

After training, the neural network 300 may be used to localize the vehicle 105 and detect objects depicted within received images 635 within a map tile 325 as shown in FIG. 6B. The output of the neural network 300 is one or more semantically segmented map tiles 340, which are described in greater detail above. For example, a trained neural network 300 may execute on the vehicle 105 computer 110 and receive images 320, map tile 325, and GPS coordinates 335 and generate a semantically segmented map tile 340 based on the input.

Figure 7:
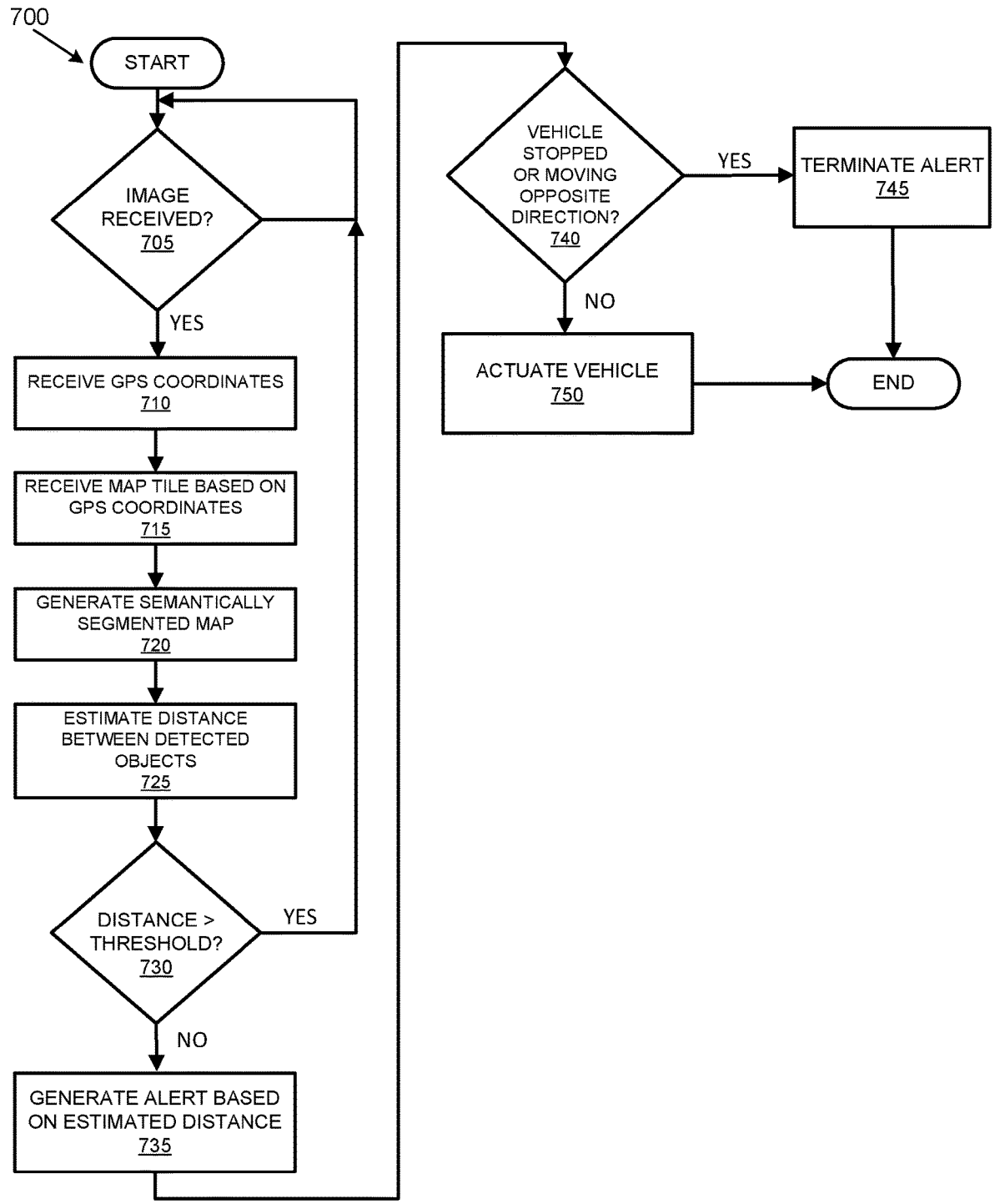
FIG. 7 is a flow diagram illustrating an example process for generating an alert based on an estimated distance between a vehicle and an object.

FIG. 7 is a flowchart of an exemplary process 700 for generating a semantically segmented map tile using the neural network 300. The semantically segmented map tiles may localize the vehicle 105 and objects depicted within one or more images captured by the sensors 115 of the vehicle 105. Blocks of the process 700 can be executed by the computer 110. The process 700 begins at block 705 in which a determination is made whether an image is received. For example, the image may be an image captured by a vehicle 105 sensor 115. If no image is received, the process 700 returns to block 705. If an image is received, GPS coordinates of the vehicle 105 are received at block 710. At block 715, a map tile representing a map of an area based on the GPS coordinates is received. For example, the computer 110 may request one or more map tiles from a cloud-based service using the GPS coordinates of the vehicle 105.

At block 720, the neural network 300 generates a semantically segmented map tile the localizes the vehicle 105 within the received map tile. As discussed above, the trained neural network 300 receives the GPS coordinates and a map tile using the GPS coordinates. The trained neural network 300 can use the GPS coordinates to localize the position of the vehicle 105 within the map tile. Additionally or alternatively, the trained neural network 300 can detect one or more objects depicted within the received image and estimate distances between the image source and the detected objects 300. Using the estimated distances and the determined location of the vehicle 105 within the map tile, the detected objects can also be localized relative to the vehicle 105 within the map tile.

At block 725, the computer 110 estimates a distance between one or more objects depicted within the image and the image source, such as the vehicle 105 sensor 115. At block 730, a determination is made whether the estimated distance is greater than a predetermined distance threshold. If the distance is greater than the predetermined distance threshold, the process 700 returns to block 705. If the distance is less than or equal to the distance threshold, an alert is generated based on the estimated distance at block 735. In an example implementation, the computer 110 may use a lookup table, or the like, to determine an alert to generate based on the estimated distance. For instance, the computer 110 can generate alerts that vary with estimated distances. In some examples, the computer 110 can vary an audible characteristic, a visual characteristic, and/or a frequency characteristic of the alert based on the estimated distance. The alert may comprise an audible alert and/or a visual alert generated within the vehicle 105.

At block 740, a determination is made whether the vehicle 105 has stopped moving or is moving in a different direction relative to the object(s). In one or more implementations, the computer 110 may determine that the vehicle 105 is moving in another direction if the estimated distance increases with respect to previous estimated distances. In one or more implementations, the computer 110 may determine that the vehicle 105 is not moving if the estimated distance has not changed with respect to previous estimated distances, one or more control components 125 indicate no torque is being generated by the vehicle 105. If the vehicle 105 has stopped moving or the vehicle 105 is moving in a different direction, the alert is terminated at block 745 and the process 700 ends.

Otherwise, the vehicle 105 is actuated at block 750. For example, the computer 110 may send a control signal to one or more components 125 to cause the vehicle 105 to stop moving or cause the vehicle 105 to move in another direction. In some examples, the computer 110 may cause the vehicle 105 from an autonomous mode to a semi-autonomous mode or manual mode or vice versa.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:

train a neural network with a set of labeled training images, wherein the set of labeled training images comprises at least one training image depicting an object within a field-of-view of a vehicle camera and at least one training label indicating a distance between the object and the vehicle camera and a position of the vehicle within a map tile;

generate a semantically segmented map tile based on at least one non-labeled training image at the deep neural network, wherein the semantically segmented map tile includes a location of the vehicle within the semantically segmented map tile and locations of detected objects with respect to the vehicle;

compare the semantically segmented map tile with ground truth data; and update at least one weight associated with a neuron of the neural network.

2. The system of claim 1, wherein the semantically segmented map tile includes at least one visual indicator indicative of the relative position of the vehicle within semantically segmented map tile.

3. The system of claim 1, wherein the neural network includes a decoder that is configured to generate the semantically segmented map tile.

4. The system of claim 1 comprising a second computer including a second processor and a second memory, the second memory including instructions such that the second processor is programmed to:

receive the neural network at a vehicle;

generate, at a first encoder included in the neural network, an encoded representation of image features of an image received from a vehicle sensor of the vehicle;

generate, at a second encoder included in the neural network, an encoded representation of map tile features; and generate, at a decoder included in the neural network, a semantically segmented map tile based on the encoded representation of image features, the encoded representation of map tile features, and Global Positioning System (GPS) coordinates of the vehicle, wherein the semantically segmented map tile includes a location of the vehicle and detected objects depicted within the image with respect to the vehicle.

5. The system of claim 4, wherein the second processor is further programmed to:

actuate the vehicle based on the detected objects.

6. The system of claim 5, wherein the second processor is further programmed to:

estimate a distance between the detected objects and the vehicle;

determine whether the estimated distance is greater than a predetermined distance threshold; and generate an alert when the estimated distance is not greater than the predetermined distance threshold.

7. The system of claim 4, wherein the second processor is further programmed to:

cause the vehicle to transition from a non-autonomous mode to an autonomous mode based on the detected objects.

8. The system of claim 4, wherein the decoder included in the neural network receives the encoded representation of image features, the encoded representation of map tile features, and the GPS coordinates of the vehicle from a latent embedding layer.

9. The system of claim 4, wherein the map tile features are based on a map tile received from a cloud-based service, the map tile representing a map corresponding to a location of the vehicle.

10. The system of claim 4, wherein the semantically segmented map tile includes at least one visual indicator of the relative position of the vehicle within the semantically segmented map tile.

11. The system of claim 10, wherein the semantically segmented map tile includes at least one visual indicator indicative of the position of the object.

12. The system of claim 5, wherein the second processor is further programmed to:

determine whether the vehicle has stopped or is moving in an opposite direction; and actuate the vehicle when the vehicle has not stopped and is not moving in the opposite direction.

13. A method comprising:

training a neural network with a set of labeled training images, wherein the set of labeled training images comprises at least one training image depicting an object within a field-of-view of a vehicle camera and at least one training label indicating a distance between the object and the vehicle camera and a position of the vehicle within a map tile;

generating a semantically segmented map tile based on at least one non-labeled training image at the deep neural network, wherein the semantically segmented map tile includes a location of the vehicle within the semantically segmented map tile and locations of detected objects with respect to the vehicle;

comparing the semantically segmented map tile with ground truth data; and updating at least one weight associated with a neuron of the neural network.

14. The method of claim 13, further comprising:

receiving the neural network at a vehicle;

generating, at a first encoder included in the neural network, an encoded representation of image features of an image received from a vehicle sensor of a vehicle;

generating, at a second encoder included in the neural network, an encoded representation of map tile features; and generating, at a decoder included in the neural network, a semantically segmented map tile based on the encoded representation of image features, the encoded representation of map tile features, and Global Positioning System (GPS) coordinates of the vehicle, wherein the semantically segmented map tile includes a location of the vehicle and detected objects depicted within the image with respect to the vehicle.

15. The method of claim 14, further comprising:

estimating a distance between the detected objects and the vehicle;

determining whether the estimated distance is greater than a predetermined distance threshold; and generating an alert when the estimated distance is not greater than the predetermined distance threshold.

16. The method of claim 14, further comprising:

determining whether the vehicle has stopped or is moving in an opposite direction; and actuating the vehicle when the vehicle has not stopped and is not moving in the opposite direction.

17. The method of claim 14, further comprising:

causing the vehicle to transition from a non-autonomous mode to an autonomous mode based on the detected objects.

18. The method of claim 14, wherein the decoder neural network receives the encoded representation of image features, the encoded representation of map tile features, and the GPS coordinates of the vehicle from a latent embedding layer.

19. The method of claim 14, wherein the map tile features are based on a map tile received from a cloud-based service, the map tile representing a map corresponding to a location of the vehicle.

20. The method of claim 14, wherein the semantically segmented map tile includes at least one visual indicator indicative of the relative position of the vehicle within the semantically segmented map tile.

\* \* \* \* \*